(12) United States Patent
Theodoras, II et al.

(10) Patent No.: US 8,165,471 B2
(45) Date of Patent: Apr. 24, 2012

(54) FORM FACTOR ADAPTER MODULE

(75) Inventors: James Thomas Theodoras, II, Milpitas, CA (US); Christophe Metivier, Los Altos, CA (US); Travis Legg, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 885 days.

(21) Appl. No.: 12/102,478

(22) Filed: Apr. 14, 2008

(65) Prior Publication Data
US 2009/0257754 A1 Oct. 15, 2009

(51) Int. Cl.
*G02B 6/36* (2006.01)
*H01R 4/28* (2006.01)
*G06F 1/00* (2006.01)
*H04B 10/00* (2006.01)

(52) U.S. Cl. ........ 398/135; 398/136; 398/137; 398/138; 398/139; 385/89; 713/300

(58) Field of Classification Search ........... 398/135–139
See application file for complete search history.

(56) References Cited

U.S. PATENT DOCUMENTS

| | | | | |
|---|---|---|---|---|
| 7,044,656 | B1* | 5/2006 | Hofmeister et al. | 385/89 |
| 7,178,996 | B2 | 2/2007 | Malagrino et al. | |
| 7,179,096 | B2 | 2/2007 | Dubé et al. | |
| 7,403,548 | B2 | 7/2008 | Muth et al. | |
| 7,577,855 | B2* | 8/2009 | Dove | 713/300 |
| 2002/0027690 | A1* | 3/2002 | Bartur et al. | 359/152 |
| 2004/0110406 | A1 | 6/2004 | Phillips et al. | |
| 2004/0246953 | A1* | 12/2004 | Muth et al. | 370/366 |
| 2005/0258895 | A1 | 11/2005 | Dove et al. | |
| 2006/0189220 | A1* | 8/2006 | Duval et al. | 439/760 |
| 2006/0216958 | A1* | 9/2006 | Yee et al. | 439/66 |
| 2006/0291785 | A1 | 12/2006 | Epitaux et al. | |
| 2007/0134961 | A1* | 6/2007 | Myong et al. | 439/160 |
| 2007/0297733 | A1 | 12/2007 | Mader et al. | |
| 2009/0257754 | A1 | 10/2009 | Theodoras et al. | |
| 2011/0058777 | A1 | 3/2011 | Gazzola et al. | |

FOREIGN PATENT DOCUMENTS

WO 2009129151 A1 10/2009

OTHER PUBLICATIONS

Spilman, Antony "A Cooperation Agreement for 10 Gigabit Ethernet Transceiver Package", Xenpak SA, Rev 3.0, Issue 3.0, (Sep. 18, 2002),1-77.

(Continued)

*Primary Examiner* — Danny Leung

(57) ABSTRACT

According to one example embodiment, a form factor adapter module may include a small form factor (SFF) host connector, an X2 or XENPAK edge finger connector, and a serial to XAUI transceiver. The SFF host connector may be configured receive a small form factor pluggable (SFP or SFP+) module and to transmit and receive data according to a Serial Gigabit Media Independent Interface (SGMII) or Serializer-deserializer Framer Interface (SFI) protocol. The X2 or XENPAK edge finger connector may be configured to mate with an X2 or XENPAK edge finger socket and to transmit and receive data according to a Ten Gigabit Ethernet Attachment Unit Interface (XAUI) protocol. The serial to XAUI transceiver may be coupled to both the SFF host connector and the X2 or XENPAK edge finger connector. The serial to XAUI transceiver may be configured to convert data between the SGMII or SFI protocol and the XAUI protocol.

18 Claims, 4 Drawing Sheets

OTHER PUBLICATIONS

"SFF Committee; INF-8074i Specification for SFP (Small Formfactor Pluggable) Transceiver", Rev 1.0; SFF Committee ftp://ftp.seagate.com/ff, (May 12, 2001),1-38.

"SFF-8083 Specification for 0.8mm SFP+ Compliant Card Edge Connector", Rev 1.2, (Nov. 2, 2007),1-20.

"SFF-8431 Specification for Enhanced 8,5 and 10 Gigabit Small Form Factor Pluggable Module "SFP+"", SFF Committee, Revision 2.1, (Aug. 30, 2007),1-109.

"SFF—8432 Specification for Improved Pluggable Formfactor", SFF Committee, SFF-8432 Rev 5.0, (Jul. 16, 2007),1-17.

"SFF-8472 Diagnostic Monitoring Interface for Optical Transceivers", SFF Committee; Rev 10.3, (Dec. 1, 2007),1-36.

"Quanta Computer Selects AMCC's QT2025 10GbE PHY for Its High Density Switching Platform", Applied Micro Circuits Corporation, Feb. 25, 2008, 2 Pages, document retrieved from: http://investor.amcc.com/releasedetail.cfm?releaseid=295761.

Tsumura, Eddie, "EDC Vendors Highlight Interoperability with ExceLight SFP+ Transceivers", News from ExceLight Communications, Mar. 23, 2007, 5 Pages.

International Search Report & Written Opinion for PCT Application No. PCT/US2009/040244, mailed on Jun. 17, 2009, 12 Pages.

U.S. Appl. No. 12/557,114 Final Office Action mailed Oct. 29, 2010, 8 pages.

U.S. Appl. No. 12/557,114, Non-Final Office Action mailed May 13, 2010, 16 pages.

U.S. Appl. No. 12/557,114 Notice of Allowance mailed Aug. 10, 2011, 11 pges.

Office Action Response filed for U.S. Appl. No. 12/557,114, filed Aug. 16, 2010, 9 pages.

Office Action Response filed for U.S. Appl. No. 12/557,114, filed Jan. 10, 2011, 11 pages.

Hardy, Stephen, "EDC vendors try again on LRM", Lightwave Issue, Apr. 30, 2007, 4 pages.

"AMCC Demonstrates QT2035S at ECOC 2006", Applied Micro Circuits Corp., Sep. 25, 2006, 2 pages.

"10 Gbps XAUI or XGMII to XFI LAN/WAN Transceiver", Product No. VSC8486, Vitesse, retreived on May 9, 2011, Available at: http://www.vitesse.com/products/product.php?number=VSC8486.

Ethernet Product VSC8486 Product Brief, May 22, 2007.

U.S. Appl. No. 12/557,114 Non-Final Office Action mailed Feb. 4, 2011, 9 pages.

* cited by examiner

302 — MATE A FIRST END OF AN ADAPTER MODULE WITH AN X2 OR XENPAK EDGE FINGER SOCKET

304 — RECEIVE AT A SECOND END OF THE ADAPTER MODULE A SMALL FORM FACTOR PLUGGABLE (SFP OR SFP+) MODULE

306
- RECEIVE SFI OR SGMII DATA ACCORDING TO AN SFI OR SGMII PROTOCOL
- CONVERT THE SFI OR SGMII DATA TO A XAUI PROTOCOL
- SEND THE CONVERTED SFI OR SGMII DATA

308
- RECEIVE XAUI DATA ACCORDING TO A XAUI PROTOCOL
- CONVERT THE XAUI DATA TO THE SFI OR SGMII PROTOCOL
- SEND THE CONVERTED XAUI DATA TO THE SFP OR SFP+ MODULE

FORM FACTOR ADAPTER MODULE

TECHNICAL FIELD

This description relates to fiber optic communications.

BACKGROUND

In general, a fiber optic transceiver is a communications device having an optical interface and an electrical interface. The optical interface transmits and receives fiber optic signals (e.g., through a set of fiber optic cables). The electrical interface transmits and receives electrical signals (e.g., through a circuit board connector mounted to a printed circuit board or PCB).

X2 and XENPAK are standard "off-the-shelf" fiber optic transceiver packages which are optimized for IEEE 802.3ae Ethernet communications. The electrical interfaces of both X2 and XENPAK operate according to the parallel Ten Gigabit Ethernet Attachment Unit Interface (XAUI) protocol, and have seventy-pin electrical interfaces, but have different physical form factors. A XENPAK module is, for example, physically larger than an X2 module.

Small form factor pluggable (SFP or SFP+) modules are also standard "off-the-shelf" fiber optic transceiver packages which are optimized for high-speed fiber optic channel applications. Both SFP modules and SFP+ modules include electrical interfaces which operate according to a serial protocol, and have twenty-pin electrical interfaces which plug into a small form factor (SFF) host connector. The electrical interface of an SFP module operates according to a Serial Gigabit Media Independent Interface (SGMII), whereas the electrical interface of an SFP+ module operates according to a Serializer-deserializer Framer Interface (SFI) protocol. However, both SFP and SFP+ may have compatible physical form factors. In general, the physical form factor of an SFP or SFP+ fiber optic transceiver is smaller than an X2 or XENPAK fiber optic transceiver.

BRIEF DESCRIPTION OF THE DRAWINGS

FIG. 3 is a flowchart showing a method according to an example embodiment.

DETAILED DESCRIPTION

Overview

According to one general aspect, a form factor adapter module may include a small form factor (SFF) host connector, an X2 or XENPAK edge finger connector, and a serial to Ten Gigabit Ethernet Attachment Unit Interface (XAUI) transceiver. The SFF host connector may be configured receive a small form factor pluggable (SFP or SFP+) module and to transmit and receive data according to a Serial Gigabit Media Independent Interface (SGMII) or Serializer-deserializer Framer Interface (SFI) protocol. The X2 or XENPAK edge finger connector may be configured to mate with either an X2 or XENPAK edge finger socket and to transmit and receive data according to a XAUI protocol. The serial to XAUI transceiver may coupled to both the SFF host connector and the X2 or XENPAK edge finger connector. The serial to XAUI transceiver may be configured to convert data between the SGMII or SFI protocol and the XAUI protocol.

According to another general aspect, a method may include mating a first end of an adapter module with an X2 or XENPAK edge finger socket. The method may also include receiving, at a second end of the adapter module, a small form factor pluggable (SFP or SFP+) module. The method may also include receiving, from the SFP or SFP+ module, Serial Gigabit Media Independent Interface (SGMII) or Serializer-deserializer Framer Interface (SFI) data according to an SGMII or SFI protocol, converting the SGMII or SFI data to a Ten Gigabit Ethernet Attachment Unit Interface (XAUI) protocol, and sending the converted SGMII or SFI data to the X2 or XENPAK edge finger socket. The method may also include receiving, from the X2 or XENPAK edge finger socket, XAUI data according to the XAUI protocol, converting the XAUI data to the SGMII or SFI protocol, and sending the converted XAUI data to the SFP or SFP+ module.

DESCRIPTION OF EXAMPLE EMBODIMENTS

Figure 1:
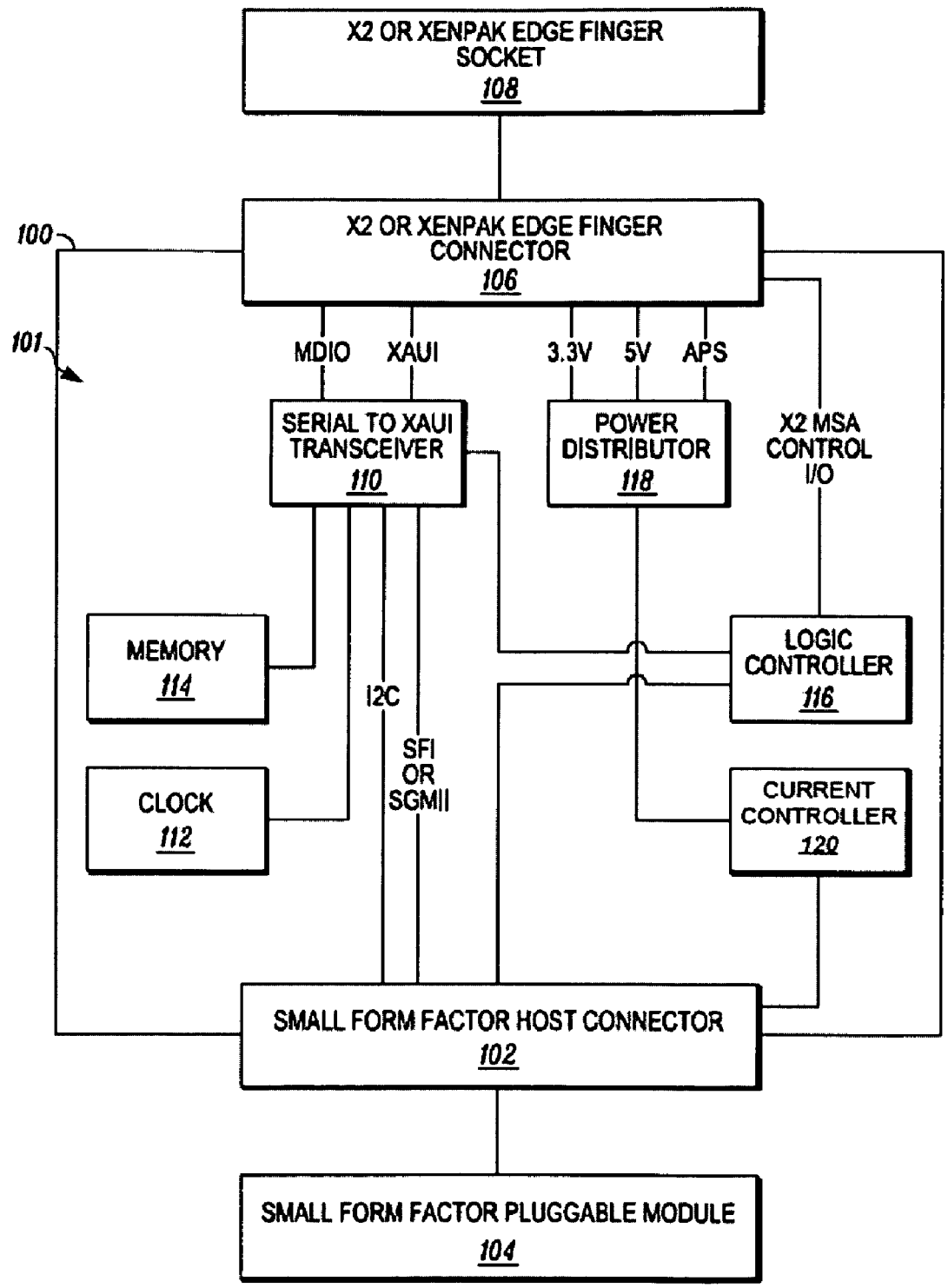
FIG. 1 is a block diagram of a form factor adapter module according to an example embodiment.

FIG. 1 is a block diagram of a form factor adapter module 100 according to an example embodiment. The form factor adapter module 100 may include a printed circuit board (PCB) 101, which may allow any or all of the components described below to be mounted onto the form factor adapter module 100.

In an example embodiment, the form factor adapter module 100 may include a small form factor (SFF) host connector 102. The SFF host connector 102 may be mounted onto the PCB 101, according to an example embodiment. The SFF host connector 102 may include a twenty-pin edge female socket. The SFF host connector 102 may, for example, be configured to receive a small form factor pluggable (SFP or SFP+) module 104, which may conform to either an SFP or SFP+ standard. The SFF host connector 102 may be configured to transmit and receive data according to a Serial Gigabit Media Independent Interface (SGMII) or a Serializer-deserializer Framer Interface (SFI) protocol.

The SFP or SFP+ module 104 may, for example, include an edge card connector configured to plug into the SFF host connector 102 and create an electrical coupling between the SFP or SFP+ module 104 and the SFF host connector 102. The SFP or SFP+ module 104 may also include a fiber optic cable which carries data according to an SFP or SFP+ optical protocol. The SFP or SFP+ module 104 may, for example, convert data between an electrical protocol and an optical protocol, and relay data between the SFF host connector 102 and the fiber optic cable.

The form factor adapter module 100 may also include an X2 or XENPAK edge finger connector 106. The X2 or XENPAK edge finger connector 106 may be mounted onto the PCB 101, according to an example embodiment. The X2 or XENPAK connector 106 may include a seventy-pin edge finger connector. The X2 or XENPAK edge finger connector 106 may be configured to transmit and receive data according to a Ten Gigabit Ethernet Attachment Unit Interface (XAUI) protocol. The X2 or XENPAK edge finger connector 106 may, for example, be configured to mate with either an X2 or XENPAK edge finger socket 108. The X2 or XENPAK edge finger socket 108 may be configured to receive the X2 or XENPAK edge finger connector 106 and create an electrical coupling between the X2 or XENPAK edge finger socket 108 and the X2 or XENPAK edge finger connector 106. The X2 or XENPAK edge finger socket 108 may also be coupled to a network device, such as a switch or router. The X2 or XENPAK edge finger socket 108 may, for example, relay data between the X2 or XENPAK edge finger connector 106 and the network device.

The form factor adapter module 100 may also include a serial to XAUI transceiver 110. The serial to XAUI transceiver 110 may, for example, include an SFI-to-XAUI serializer-deserializer or an SGMII to XAUI serializer-deserializer. The serial to XAUI transceiver 110 may be secured to the PCB 101. The serial to XAUI transceiver 110 may be configured to convert data between the SGMII or SFI protocol (such as data received from or sent to either an SFP module or an SFP+ module) and the XAUI protocol. For example, the serial to XAUI transceiver 110 may be configured to receive SGMII or SFI data from the SFF host connector 102 according to the SGMII or SFI protocol, convert the SGMII or SFI data to the XAUI protocol, and send the converted SGMII or SFI data to the X2 or XENPAK edge finger connector 106, and to receive XAUI data from the X2 or XENPAK edge finger connector 106 according to the XAUI protocol, convert the XAUI data to the SGMII or SFI protocol, and send the converted XAUI data to the SFF host connector 102. The serial to XAUI transceiver 110 may be coupled to both the SFF host connector 102 and the X2 or XENPAK edge finger connector 106.

In an example embodiment, the serial to XAUI transceiver 110 may be coupled to each of the SFF host connector 102 and the X2 or XENPAK edge finger connector 106 via both a control path and a data path. The serial to XAUI transceiver 110 may be coupled to the SFF host connector 102 via a narrow parallel bus, which may include an inter-integrated circuit (e.g., 12C) control path and a high speed serial electrical interface (e.g., SGMII or SFI) data path. The data path may, for example, include an SFI data path if the SFP or SFP+ module 104 includes an SFP+ module, and may include an SGMII data path if the SFP or SFP+ module 104 includes an SFP module, according to example embodiments. The data path between the serial to XAUI transceiver 110 and the SFF host connector 102 may utilize differential signaling, and may include one pair of wires in each of the transmit and receive directions, for a total of four wires, according to an example embodiment.

The serial to XAUI transceiver 110 may be coupled to the X2 or XENPAK edge finger connector 106 via a wide parallel bus, which may include a management data input/output (e.g., MDIO) control path, and an attachment unit interface (e.g., XAUI) data path. The data path between the serial to XAUI transceiver 110 and the X2 or XENPAK edge finger connector 106 may include four pairs of wires in each of the transmit and receive directions, for a total of sixteen wires, according to an example embodiment.

The form factor adapter module 100 may also include a clock 112. The clock 112 may be secured to the PCB 101. The clock 112 may provide clock impulses to the serial to XAUI transceiver 110, according to an example embodiment.

The adapter 100 may also include a memory 114. The memory 114 may be secured to the PCB 101, and may be coupled to the serial to XAUI transceiver 110. The memory 114 may, for example, provide instructions to the serial to XAUI transceiver 110. The memory 114 may also, for example, maintain identity information and perform monitoring functions, such as monitoring power levels of the adapter 100.

In the example shown in FIG. 1, the adapter 100 may include a logic controller 116. The logic controller 116 may be secured to the PCB 101. The logic controller 116 may be coupled to any or all of the SFF host connector 102, the X2 or XENPAK edge finger connector 106, and the serial to XAUI transceiver 110. The logic controller 116 may, for example, include reset logic, and may reset any or all of the SFF host connector 102, the X2 or XENPAK edge finger connector 106, and the serial to XAUI transceiver 110.

The form factor adapter module 100 may also include a power distributor 118. The power distributor 118 may be secured to the PCB 101. The power distributor 118 may, for example, be coupled to and receive power from the X2 or XENPAK edge finger connector 106. In an example embodiment, the power distributor 118 may receive a plurality of voltage levels from the X2 or XENPAK edge finger connector 106, such as 3.3 volts, 5 volts, and/or an adaptive power supply (APS). The X2 or XENPAK edge finger connector 106 may in turn receive power from the network device (not shown) via the X2 or XENPAK edge finger connector 108. The power distributor 118 may distribute power to any or all of the devices within the form factor adapter module 100, such as the SFF host connector 102, the serial to XAUI transceiver 110, the clock 112, the memory 114, the logic controller 116, and/or a hot swappable current controller 120 (discussed below), according to various example embodiments.

In the example shown in FIG. 1, the form factor adapter module 100 may also include the hot swappable current controller 120. The hot swappable current controller 120 may be secured to the PCB. The hot swappable current controller 120, which may receive power from the power distributor 118, may control current change in the SFF host connector 102, such as by allowing current levels to change only gradually and not in spikes.

Figure 2A:
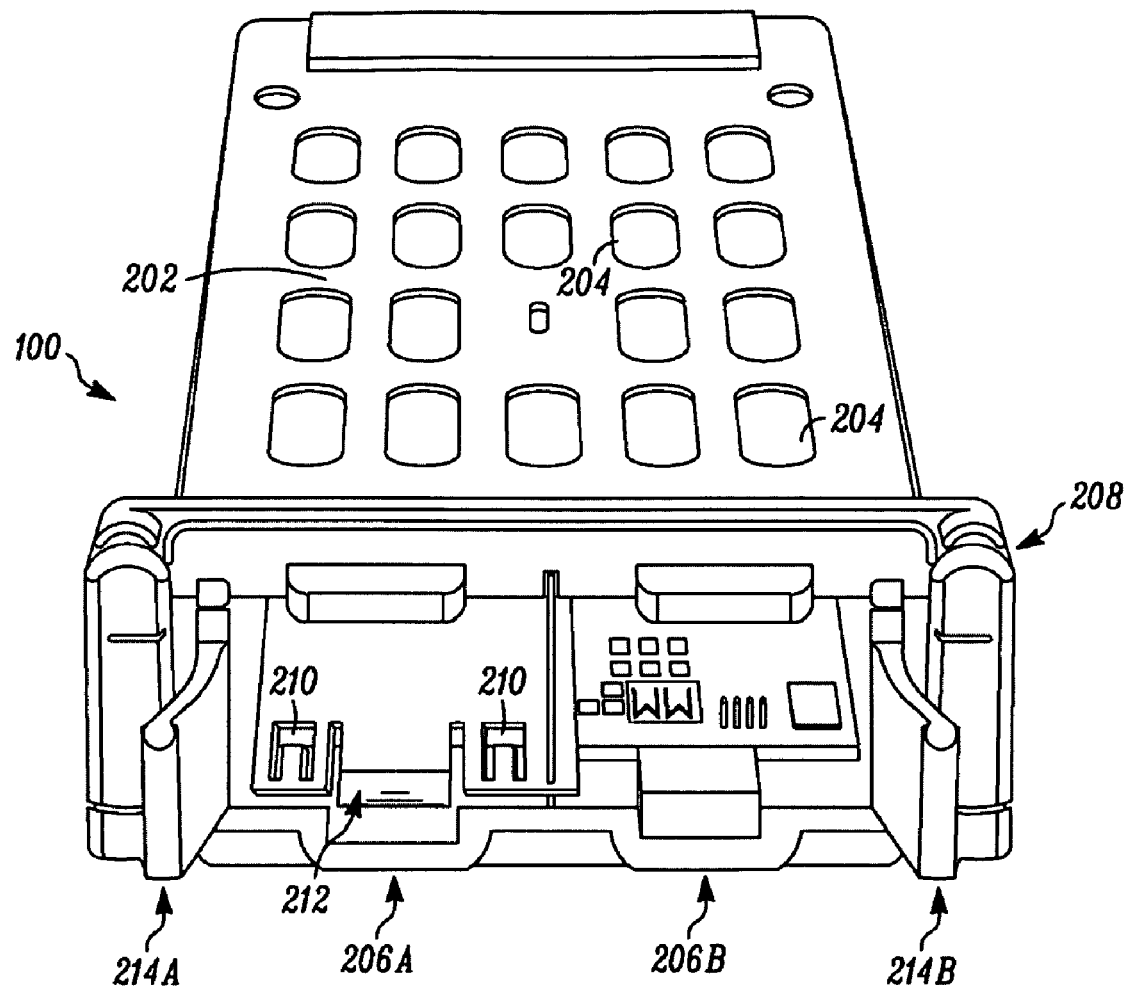
FIG. 2A is a front top perspective view showing a form factor adapter module according to another example embodiment.

FIG. 2A is a front top perspective view showing the form factor adapter module 100 according to an example embodiment. In this example, the form factor adapter module 100 may include a housing 202. The housing 202 may enclose any or all of the components of the form factor adapter module 100 described with reference to FIG. 1. The housing 202 may include a plurality of apertures 204, which may serve as air vents or heat sinks to allow the form factor adapter module 100 to dissipate heat, according to an example embodiment. The apertures 204 may be included on at least one side of the housing 202, such as on at least one side which is adjacent to the opposite ends on which the SFF host connector 102 and the X2 or XENPAK edge finger connector 106 are located. In the example shown in FIG. 2A, the apertures 204 may be included on an outside surface of the housing 202, such as on a top portion and/or a bottom portion of the housing 202.

The form factor adapter module 100 may also, for example, include one or more, such as two, SFF host connector ports 206A, 206B. While two SFF host connector ports 206A, 206B are shown in FIG. 2A, any number of SFF host connector ports 206A, 206B may be included in the form factor adapter module 100; for example, the form factor adapter module 100 may include only one SFF host connector port 206 corresponding to the one SFF host connector 102 shown in the example in FIG. 1. The SFF host connector ports 206A, 206B may include apertures configured to receive optical cables or modules which carry data and/or communicate according to the SGMII or SFI protocol. For example, the SFF host connector ports 206A, 206B may be configured to receive SFP or SFP+ modules 104 (not shown in FIG. 2A).

The SFF host connector ports 206A, 206B may be surrounded by a faceplate 208, according to an example embodiment. The faceplate 208 may be included in the housing 202. The faceplate 208 may be configured to rest flush against a housing of an interface with which the X2 or XENPAK edge finger connector 106 engages, such as the X2 or XENPAK edge finger connector 108, when a substantial portion of the form factor adapter module 100 has been inserted into an X2 or XENPAK bay (not shown).

In an example embodiment, one or more portions of the form factor adapter module 100 which surround the one or more SFF host connector ports 206A, 206B may include apertures 210 or perforations; in this example, the SFF host connector ports 206A, 206B include apertures 210. The apertures 210 or perforations may dissipate electromagnetic interference emanating from the optical cable and/or the SFP or SFP+ module 104, according to an example embodiment. Each of the SFF host connector ports 206A, 206B may also include a retention or compression mechanism 212, according to an example embodiment. The compression mechanism 212 may, for example, secure the SFP or SFP+ module 104 within the SFF host connector port 206A, such as by frictional engagement. The compression mechanism 212 may be spring loaded to assist with the frictional engagement, according to an example embodiment.

The housing 202 and/or the form factor adapter module 100 may include a latch mechanism configured to secure the form factor adapter module 100 within the X2 or XENPAK bay, according to an example embodiment. The latch mechanism may, for example, secure the apparatus 100 within the X2 or XENPAK bay with the X2 or XENPAK edge finger connector 106 in electrical contact with an X2 or XENPAK edge finger socket 108 of the X2 or XENPAK bay. In an example embodiment, the latch mechanism may include latch release arms 214A, 214B and latches 216, described below. The X2 or XENPAK edge finger socket 108 may be included in the X2 or XENPAK bay, and may be configured to receive the data according to the XAUI protocol.

In the example shown in FIG. 2A, the housing 202 and/or the form factor adapter module 100 may include latch release arms 214A, 214B. The latch release arms 214A, 214B may enable a user, by squeezing the latch release arms 214A, 214B, to cause the latching mechanism to release the form factor adapter module 100 from the X2 or XENPAK bay, according to an example embodiment.

Figure 2B:
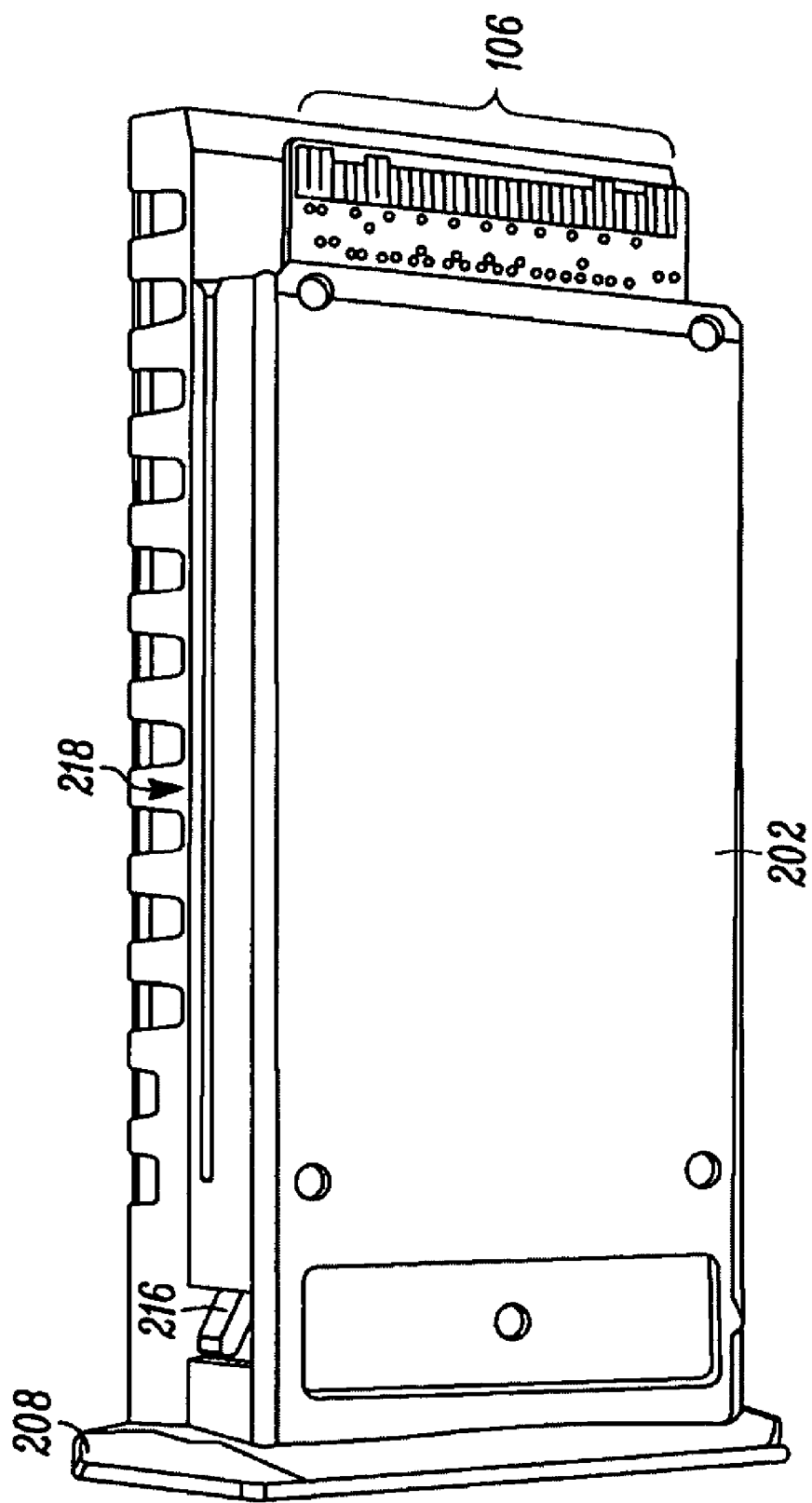
FIG. 2B is a side bottom perspective view showing the form factor adapter module of FIG. 2A according to an example embodiment.

FIG. 2B is a side bottom perspective showing the form factor adapter module 100 according to an example embodiment. This example shows the latch 216 extending from one side of the form factor adapter module 100. The form factor adapter module 100 may include a second latch (not shown) extending from the opposite side of the form factor adapter module 100. The latch 216 may, for example, be spring-loaded, and may be configured to mate with an aperture of the X2 or XENPAK bay to secure the form factor adapter module 100 within the X2 or XENPAK bay. The latch 216 may be configured to retract and release the form factor adapter module 100 in response to pressure being placed on the latch release arms 210A, 210B, such as by a user squeezing the latch release arms 214A, 214B.

The housing 202 of the form factor adapter module 100 may also include a slot 218 or guide rail on one or both sides. The slot 218 or guide rail may be configured to mate with a pin, rail, or slot of the X2 or XENPAK bay to guide the form factor adapter module 100 as the form factor adapter module 100 is inserted into the X2 or XENPAK bay, according to an example embodiment.

FIG. 3 is a flowchart showing a method 300 according to an example embodiment. In this example, the method 300 may include mating a first end of an adapter module with an X2 or XENPAK edge finger socket 108 (302). The mating (302) may be performed, for example, by the X2 or XENPAK edge finger connector 106. For example, a seventy-pin X2 or XENPAK edge finger connector 106 may be inserted into the X2 or XENPAK edge finger socket 108. The seventy-pin X2 or XENPAK edge finger connector 106 may be secured into the X2 or XENPAK bay (which may include the X2 or XENPAK edge finger socket 108) with a latch 216. The X2 or XENPAK edge finger socket 108 may include seventy pins.

The method 300 may also include receiving, at a second end of the adapter module, an SFP or SFP+ module 104 (304). The receiving (304) may be performed, for example, by the SFF host connector 102. For example, SFF host connector 102 may be provided at a second end of the adapter module 100. The SFF host connector 102 may include twenty pins, and the SFP or SFP+ module 104 may include twenty pins.

The method 300 may also include receiving SGMII or SFI data according to the SGMII or SFI protocol from the SFP or SFP+ module 104, converting the SGMII or SFI data to the XAUI protocol, and sending the converted SGMII or SFI data to the X2 or XENPAK edge finger socket 108 (306). In an example embodiment, the SFF host connector 102 may receive the SGMII or SFI data, the serial to XAUI transceiver 110 may convert the SGMII or SFI data, and the X2 or XENPAK edge finger connector 106 may send the converted SGMII or SFI data.

The method 300 may also include receiving XAUI data according to the XAUI protocol from the X2 or XENPAK edge finger socket 108, converting the XAUI data to the SGMII or SFI protocol, and sending the converted XAUI data to the SFP or SFP+ module 104 (308). In an example embodiment, the X2 or XENPAK edge finger connector 106 may receive the XAUI data, the serial to XAUI transceiver 110 may convert the data, and the SFF host connector 102 may send the data.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A form factor adapter module comprising:
    a small form factor (SFF) host connector configured to receive a small form factor pluggable (SFP or SFP+) module and to transmit and receive data according to a Serial Gigabit Media Independent Interface (SGMII) or Serializer-deserializer Framer Interface (SFI) protocol;
    an X2 or XENPAK edge finger connector configured to mate with an X2 or XENPAK edge finger socket and to transmit and receive data according to a Ten Gigabit Ethernet Attachment Unit Interface (XAUI) protocol;
    a serial to XAUI transceiver coupled to both the SFF host connector and the X2 or XENPAK edge finger connector, the serial to XAUI transceiver being configured to convert data between the SGMII or SFI protocol and the XAUI protocol;
    a power distributor coupled to the X2 or XENPAK edge finger connector and the serial to XAUI transceiver, the power distributor being configured to receive power from the X2 or XENPAK edge finger connector and provide power to the serial to XAUI transceiver; and
    a hot swappable current controller coupled to the power distributor and the SFF host connector, the hot swappable current controller being configured to receive power from the power distributor and control current levels flowing from the SFF host connector.

2. The form factor adapter module of claim 1, wherein the SFF host connector includes a twenty-pin small form factor pluggable host connector configured to receive the SFP or SFP+ module and to transmit and receive data according to the SGMII or SFI protocol.

3. The form factor adapter module of claim 1 and further comprising:
a housing, the housing including a plurality of apertures configured to dissipate heat; and
wherein the SFF host connector includes one or more perforations configured to dissipate electromagnetic energy emanating from a cable or module.

4. The form factor adapter module of claim 1, wherein the X2 or XENPAK edge finger connector includes a seventy-pin X2 edge finger connector.

5. The form factor adapter module of claim 1, wherein the X2 or XENPAK edge finger connector includes a seventy-pin XENPAK edge finger connector.

6. The form factor adapter module of claim 1, wherein the serial to XAUI transceiver is configured to:
receive SGMII or SFI data from the SFF host connector according to the SGMII or SFI protocol, convert the SGMII or SFI data to the XAUI protocol, and send the converted SGMII or SFI data to the X2 or XENPAK edge finger connector; and
receive XAUI data from the X2 or XENPAK edge finger connector according to the XAUI protocol, convert the XAUI data to the SGMII or SFI data protocol, and send the converted XAUI data to the SFF host connector.

7. The form factor adapter module of claim 1, wherein the serial to XAUI transceiver is coupled to the SFF host connector via an inter-integrated circuit control path and an SFI data path.

8. The form factor adapter module of claim 1, wherein the serial to XAUI transceiver is coupled to the SFF host connector via an inter-integrated circuit control path and an SGMII data path.

9. The form factor adapter module of claim 1, wherein the serial to XAUI transceiver is coupled to the X2 or XENPAK edge finger connector via a management data input/output control path and a XAUI data path.

10. The form factor adapter module of claim 1, wherein the serial to XAUI transceiver includes an SFI-to-XAUI serializer-deserializer.

11. The form factor adapter module of claim 1, further comprising a memory coupled to the serial to XAUI transceiver, the memory being configured to provide instructions to the serial to XAUI transceiver, the memory also storing information to allow power levels of the form factor adapter module to be monitored.

12. The form factor adapter module of claim 1, further comprising a clock coupled to the serial to XAUI transceiver, the clock being configured to provide clock impulses to the serial to XAUI transceiver.

13. The form factor adapter module of claim 1, further comprising a reset logic configured to reset at least a portion of the form factor adapter module.

14. The form factor adapter module of claim 1, further comprising a latch mechanism configured to secure the form factor adapter module within an X2 or XENPAK bay with the X2 or XENPAK edge finger connector mated with the X2 or XENPAK edge finger socket, the X2 or XENPAK edge finger socket being included in the X2 or XENPAK bay.

15. The form factor adapter module of claim 1, wherein:
the form factor adapter module further comprises a housing enclosing the serial to XAUI transceiver, at least a portion of the SFF host connector, and at least a portion of the X2 or XENPAK edge finger connector;
the SFF host connector and the X2 or XENPAK edge finger connector are located on opposite ends of the form factor adapter module; and
the housing includes a plurality of apertures on at least one side of the housing, the at least one side being adjacent to the opposite ends on which the SFF host connector and the X2 or XENPAK edge finger connector are located.

16. A form factor adapter module comprising:
a small form factor (SFF) host connector configured to receive a small form factor pluggable (SFP or SFP+) module and to transmit and receive data according to a Serial Gigabit Media Independent Interface (SGMII);
an X2 or XENPAK edge finger connector configured to mate with an X2 or XENPAK edge finger socket and to transmit and receive data according to a Ten Gigabit Ethernet Attachment Unit Interface (XAUI) protocol;
a serial to XAUI transceiver coupled to both the SFF host connector and the X2 or XENPAK edge finger connector, the serial to XAUI transceiver being configured to convert data between the SGMII protocol and the XAUI protocol;
a power distributor coupled to the X2 or XENPAK edge finger connector and the serial to XAUI transceiver, the power distributor being configured to receive power from the X2 or XENPAK edge finger connector and provide power to the serial to XAUI transceiver; and
a hot swappable current controller coupled to the power distributor and the SFF host connector, the hot swappable current controller being configured to receive power from the power distributor and control current levels flowing from the SFF host connector;
wherein the SFF host connector includes a twenty-pin small form factor pluggable host connector configured to receive the SFP or SFP+ module and to transmit and receive data according to the SGMII protocol; and
wherein the serial to XAUI transceiver is coupled to the SFF host connector via an inter-integrated circuit control path and an SGMII data path.

17. The form factor adapter module of claim 16 and further comprising a memory, the memory storing information to allow power levels of the form factor adapter module to be monitored.

18. The form factor adapter module of claim 16, further comprising a reset logic configured to reset one or more of the SFF host connector, the X2 or XENPAK edge finger connector and/or the serial to XAUI transceiver.

* * * * *